Dec. 18, 1951   R. R. LOWRY   2,579,388
DISPENSER FOR EITHER A MEASURED OR AN UNMEASURED
QUANTITY OF GRANULAR MATERIAL
Filed July 15, 1947
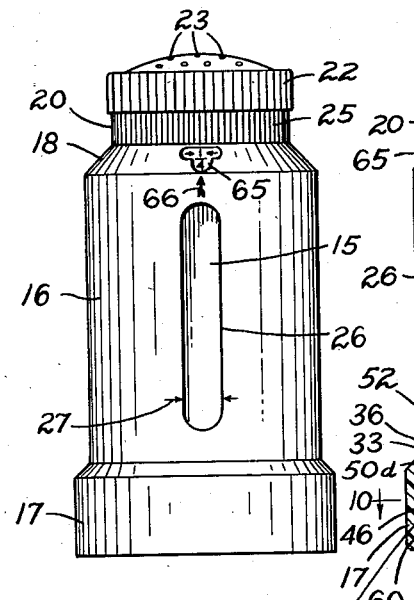
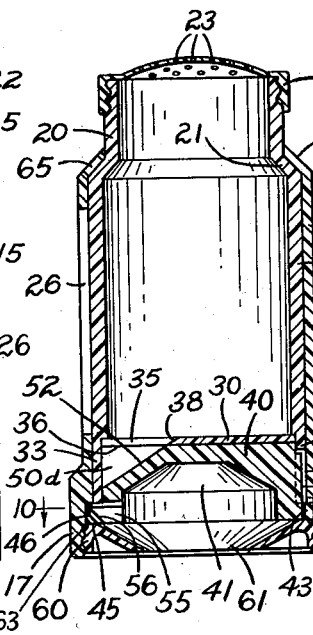
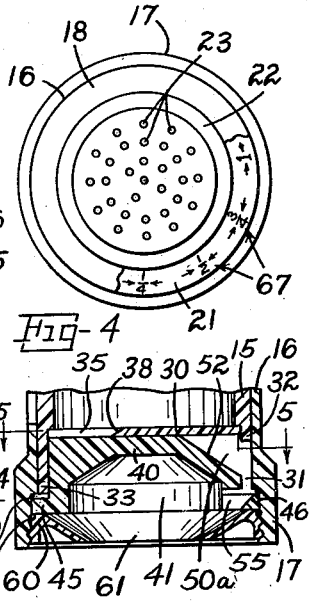
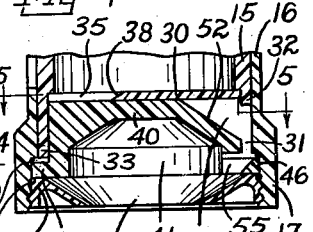
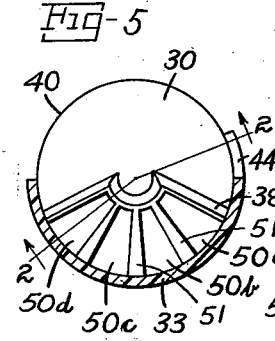
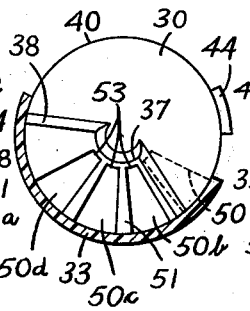
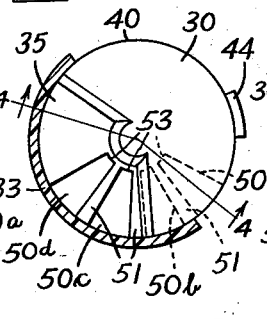
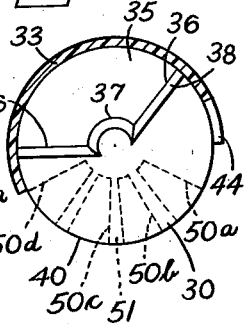
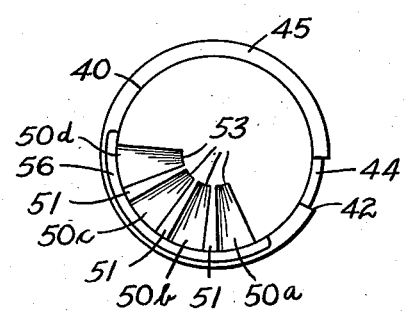
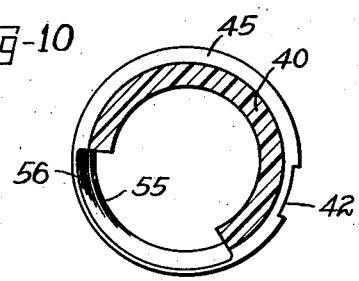
INVENTOR
Robert R. Lowry
BY Marechal & Biebel
ATTORNEYS Patented Dec. 18, 1951

2,579,388

UNITED STATES PATENT OFFICE 2,579,388

DISPENSER FOR EITHER A MEASURED OR AN UNMEASURED QUANTITY OF GRANULAR MATERIAL

Robert R. Lowry, Dayton, Ohio

Application July 15, 1947, Serial No. 761,088

8 Claims. (Cl. 222—362)

This invention relates to dispensers, and more particularly to a dispenser for powdered or granular materials such as condiments and the like.

One of the principal objects of the invention is to provide a dispenser for salt or the like of simple and inexpensive construction which is capable of use alternatively for dispensing either a definite and measured quantity or an unmeasured amount of its contents.

Another object is to provide a dispenser having a shaker top for dispensing an unmeasured amount of its contents and which also has at the lower end thereof a mechanism for dispensing an accurately measured quantity of the contents thereof.

It is also an object of the invention to provide a dispenser for powdered or granular materials including a pair of relatively rotatable concentric barrels provided at their lower ends with co-operating parts effective to dispense accurately measured quantities of the contents of the inner barrel upon relative rotation of the two barrels.

A further object is to provide a dispenser for powdered or granular materials capable of delivering accurately measured quantities of the contents thereof and formed of simple component parts which are adapted for ready formation of molded plastic or other readily fabricated suitable materials and which can thus be made in quantity at relatively low unit cost.

Other objects and advantages of the invention will be apparent from the following description, the accompanying drawings and the appended claims.

In the drawings:

Fig. 1 is a view in side elevation of a dispenser in accordance with the invention;

Fig. 2 is a view in vertical section through the dispenser taken approximately as indicated by the line 2—2 of Fig. 5;

Fig. 3 is a top view of the dispenser;

Fig. 4 is a fragmentary view similar to Fig. 2 but showing the parts rotated to a position for discharging some of the contents of the dispenser through the lower end thereof, the view being taken approximately as indicated by the line 4—4 of Fig. 7;

Figs. 5 to 8 inclusive are diagrammatic views taken approximately at the level indicated by the line 5—5 of Fig. 4 and illustrating different positions of the parts during relative rotation of the inner and outer barrels;

Fig. 9 is a detail view in top plan of the measuring and dispensing member of the device of Fig. 1; and Fig. 10 is another detail view of the dispensing and measuring member taken in section approximately as indicated by the line 10—10 of Fig. 2.

In the drawings, which illustrate a preferred embodiment of the present invention, Figs. 1 and 2 show a dispensing device which includes a cylindrical inner barrel or container 15 and a cylindrical outer barrel 16 each formed of molded plastic or other suitable material and mounted in concentric and rotatable relation. Barrel 16 is open at its lower end and provided with an enlarged base portion 17 for supporting the device in upright position, and the upper end of barrel 16 is turned inwardly to form a frusto-conical shoulder 18. The inner barrel or container 15 is formed with an upper portion 20 of smaller diameter than the remainder thereof and an intermediate frusto-conical shoulder portion 21 adapted to abut the shoulder 18 and thus to limit upward movement of the container within barrel 16.

The upper end of the container portion 20 is provided with a cap which may be a shaker cap 22 threaded thereon and having a multiplicity of holes 23 therethrough as shown in Fig. 3 for dispensing the contents of container 15 by shaking the device in the usual way. The container portion 20 is also knurled, fluted or otherwise treated as indicated at 25 to facilitate manual rotation of the container within barrel 16 and to facilitate tightening the top. If the barrel is formed of a non-transparent material, it may be provided with a window 26 to permit ready viewing of the contents of container 15 to determine when the container requires refilling. Fig. 1 shows an index mark 27 on the barrel which serves as a ready reminder that refilling is required when the contents of the container fall below the indicated level of the index mark.

The bottom of the container 15 is formed by a plate 30 which may be formed integrally with or cemented or otherwise secured to the container in substantially rigid and non-rotatable relation. It will also be noted in Fig. 2 that the plate 30 is spaced upwardly of the lower end of the barrel, leaving an annular portion of the container extending downwardly therefrom, and this portion is relieved at 31 to form a relatively short flange or skirt 32 and a substantially longer lip 33 as indicated in Fig. 2 and Figs. 5 to 8. The plate 30 has a generally segment shaped discharge aperture 35 therein of desired angular extent and including straight sides 36 and a semicircular central portion 37, these sides and the central portion being beveled to a sharp edge as indicated at 38. The plate 30 is so positioned in container 15 that the discharge aperture 35 is adjacent the lip portion 33 of the container, and lip 33 is of sufficient angular extent to overlap both sides 36 of aperture 35 as shown in Figs. 5 to 8.

A dispenser member 40 is mounted in the lower end of barrel 16 and below the bottom plate 30 of the container for rotation with respect to the container. As shown in Figs. 2 and 4, the under surface of this member 40 is hollowed out at 41 to reduce its weight, and the upper part of member 40 fits within the downwardly hanging skirt and lip portions 32 and 33 of the container. The member 40 is slotted on its side at 42 to receive a key member 43 integrally formed with or otherwise secured within the lower end of barrel 16, and this key engages within the slot 42 to secure the barrel and dispenser member together for rotation with respect to the container 15. Also, member 40 has on its side a projection 44 which is adapted to abut the vertical edges of lip 33 on the container 15, as shown in Figs. 5 and 8, and thus to limit the extent of relative rotation of the container and barrel 16. The member 40 also includes a radially projecting peripheral rim or flange 45 at its lower end, which is of somewhat larger diameter than the outer diameter of container 15 and is adapted to be received within an annular seat 46 formed in the barrel 16 as shown in Figs. 2 and 4. The axial distance between seat 46 and the lower surface of plate 30 is less than the corresponding distance between the upper surfaces of member 40 and its flange portion 45, providing clearance as indicated at 47. The slot 42 may be advantageously formed in this flange 45 as indicated in Figs. 2 and 10.

The dispenser member 40 has formed in the upper surface thereof one or more pockets 50 which are adapted upon relative rotation of container 15 and barrel 16 to be brought into and out of register with the discharge aperture 35 in bottom plate 30 and thus to receive the contents of the container. As shown in Fig. 5, there are four of these pockets 50 covering a total angular extent slightly less than the angular extent of the aperture 35, and adjacent pockets 50 are separated by partition walls 51. The bottom 52 of each pocket 50 slopes downwardly and outwardly from the center of member 40, the inner end 53 of each pocket bottom 52 being spaced slightly outwardly of the semi-circular edge 37 of the aperture 35. The dimensions of each pocket 50 are so chosen and controlled in accordance with the purpose for which the dispenser is to be used as to provide an accurately measured volume for each pocket. For example, if the dispenser is to be used for salt, each pocket 50 may be formed to have a total volume of one-quarter teaspoon as measured between the sloping bottom 52, the plane of the upper surface of member 40, and the inner surface of lip 33 on the container.

The flange portion 45 of member 40 has a discharge slot 55 cut therethrough at a position underlying the radially outer edges of pockets 50 as best seen in Figs. 2, 9 and 10. This slot 55 is formed to leave a surface 56 which extends radially beyond the periphery of the upper part of member 40 and slopes downwardly and inwardly toward the center of member 40. An annular member 60 is threaded within the lower end of barrel 16 to retain the dispenser member 40 and the container 15 in proper position within the barrel.

The member 60 is formed to provide a discharge spout opening 61 at the bottom of the barrel, the inner part of the member 60 sloping downwardly and inwardly to form the spout as shown in Figs. 2 and 4.

It will be noted that the threaded portion of member 60 is relieved at 63 to vary the extent of movement of this member 60 into barrel 16 for adjustment purposes. In the initial adjustment of the parts, member 60 is tightened sufficiently to seat the upper surface of member 40 firmly against the bottom of plate 30 to prevent leakage of the contents of container 15 while still permitting relative movement of parts 30 and 40. If wear of the parts takes place in use, it can be taken up by further tightening of member 60, thus tightening member 40 against plate 30 and transmitting this tightening action from plate 30 to the upper end of container 15 to compensate for wear between shoulders 18 and 21. The clearance 47 between flange 45 and seat 46 and the relieved portion 63 of member 60 readily permit the axial movement of members 40 and 60 relative to barrel 16 incident to this tightening action without binding of the parts.

Figs. 5 and 6 illustrate the operation of the dispenser. Fig. 5 shows the normal relative positions of the parts in which the container 15 is at the limit of its counterclockwise movement with respect to barrel 16 as determined by contact between projection 44 on member 40 and one vertical edge of lip 33 on the container. The projection 44 is so located that in this position of the parts, all of the pockets 50 will be in registry with the discharge aperture 35 in plate 30 and thus in position to receive the contents of the container, but since the lip 33 is in overlapping relation with the radially outer sides of all the pockets 50, material filling the pockets will be retained therein. In this position of the parts, the device may be readily used like an ordinary shaker dispenser, and the bottom is kept tightly closed.

Fig. 6 shows the position of the parts following sufficient clockwise rotation of the container to move the plate 30 to a position wherein the pocket 50a is completely out of register with aperture 35 but still in overlapping relation with lip 33. Thus no more of the contents of the container can pass into this pocket 50a, but no discharge has yet taken place therefrom. It will also be noted that the sharp edge of the adjacent side 36 of the aperture 35 acts to shave surplus material from pocket 50a, thus leaving therein an accurately measured quantity of the contents of the container in accordance with the predetermined capacity of each pocket.

Fig. 7 shows the position of the parts following further rotation of the container from the position shown in Fig. 6 to an angular extent approximately equal to the angular extent of pocket 50a, and Fig. 4 illustrates the same position of the parts in vertical section. This rotation has resulted in moving the lip 33 out of overlapping relation with pocket 50a, and the radially outer side of this pocket is therefore in registry with the relieved portion 31 of the skirt 32. This space 31 accordingly serves as a discharge slot through which the contents of pocket 50a pass to the slot 55 in flange 45 and thence inwardly to the discharge spout 61 in member 60, as shown in Fig. 4. It will also be noted that in this position of the parts, the pocket 50b is substantially in the same relative position as pocket 50a in Fig. 6 and is thus cut off from the interior of the container and ready for discharge upon further relative rotation of the container and barrel 16, but pocket 50c and 50d are still in register with the aperture 35 and the interior of the container.

Fig. 8 shows the position of the parts following rotation of container 15 to its limit of clockwise movement from the position shown in Fig. 5. In this position, all of the pockets 50 are in register with the discharge slot 31 and hence with the slot 55 in flange 45 and the discharge spout 61, and the contents of all the pockets will accordingly be discharged through spout 61. In addition, the upper surface of member 40 covers the entire aperture 35 and thus prevents escape of any more of the contents of the container except for the measured quantity from each pocket. For further use as a measuring dispenser, it is necessary merely to rotate the container 15 and barrel 16 in the opposite direction and return them to the relative positions shown in Fig. 5, after which the device may be used again as either a shaking or measuring dispenser as desired. It will also be noted that the device may be used as a shaker with the parts in any of the other positions shown in Figs. 6 to 8 without affecting its operation for either measured or unmeasured dispensing of its contents.

Scale means are provided for readily indicating to the user the quantity of the contents of the device discharged through spout 61. Referring to Figs. 1 and 3, the shoulder 18 on barrel 16 has a viewing aperture 65 formed therein, and an arrow 66 or other index marks may be provided adjacent aperture 65 as shown in Fig. 1. The shoulder 21 on container 15 is provided with suitable scale indicia 67 adapted to register with aperture 65 as the container and barrel are rotated. For example, if the device is designed for use as a salt shaker and each pocket 50 has a capacity of ¼ teaspoon, the scale indicia may consist of notations "¼," "½," "¾" and "1" as shown in Fig. 3. These scale indicia are so arranged on shoulder 21 that the mark "¼" will be substantially centered with respect to the viewing aperture 65 when the parts are in the relative positions shown in Fig. 7, wherein the pocket 50a is in discharging relation with slot 31, and the other notations are successively registered with aperture 65 as each additional pocket comes into full discharging position to indicate the total measured quantity of the contents of the container discharged at its lower end.

The invention accordingly provides a dispenser having notable advantages for use particularly with condiments for use in cooking or other materials which may alternatively be dispensed in either measured or unmeasured quantities. This dispenser may be used like an ordinary shaker type dispenser whenever occasion demands, and at the same time it will function to deliver accurately measured quantities of its contents when accurate measuring is desired and without requiring the use of additional measuring devices. Thus the invention provides a dispenser particularly useful for kitchen use which can readily be made in different sizes in accordance with the materials to be contained therein and with its measuring pockets formed in unit capacities appropriate to such materials and the quantities thereof most often required, and these dispensers will quickly and accurately measure and deliver desired quantities of their contents or unmeasured amounts as desired while properly preserving their contents at other times.

While the form of apparatus herein described constitutes a preferred embodiment of the invention, it is to be understood that the invention is not limited to this precise form of apparatus and that changes may be made therein without departing from the scope of the invention which is defined in the appended claims.

What is claimed is:

1. A dispenser for dry materials of the character described comprising a cylindrical container, a cylindrical barrel encircling said container in rotatable relation therewith, means forming a bottom for said container spaced above the lower end thereof and leaving a flange extending downwardly therefrom, said bottom having an aperture therethrough of limited angular extent, said flange being relieved at a position angularly spaced from said aperture to form a discharge slot, a dispenser member mounted within said barrel and below said bottom for rotation with respect to said container, means forming at least one pocket of predetermined capacity in the upper surface of said dispenser member, and means connecting said dispenser member to said barrel for rotation relative to said container to move each said pocket between a position of registry with said aperture to receive a portion of the contents of said container and a position of registry with said discharge slot, each said pocket having the bottom thereof sloping outwardly and downwardly and terminating at a level spaced above the lower end of said flange but below the upper end of said discharge slot to effect closing of said pocket by said flange when said pocket is in registry with said aperture and to effect discharge of the contents of said pocket when said pocket is in registry with said discharge slot.

2. A dispenser for dry materials of the character described comprising a cylindrical container, a cylindrical barrel encircling said container in rotatable relation therewith, means forming a bottom for said container spaced above the lower end thereof and leaving a flange extending downwardly therefrom, said bottom having an aperture therethrough of limited angular extent, said flange being relieved at a position angularly spaced from said aperture to form a discharge slot, a dispenser member mounted within said barrel and below said bottom for rotation with respect to said container, said dispenser member including an upper portion rotatably mounted within said flange and a lower portion of greater diameter than said flange forming a peripheral rim, means forming a plurality of pockets of predetermined capacity in the upper surface of said dispenser member, each said pocket having the bottom thereof inclined outwardly and downwardly and terminating at a level spaced above the lower edge of said flange but below the upper edge of said discharge slot, means forming a slot in said rim at a position spaced below each said pocket, means connecting said dispenser member to said barrel for rotation relative to said container to move each said pocket between a position of registry with said aperture and a position of registry with said discharge slot in said flange to discharge the contents of each said pocket through said discharge slot and said slot in said rim, and cooperating scale means carried by said barrel and container for indicating the extent of rotation necessary to move each said pocket from a position of registry with said aperture to a position of registry with said discharge slot.

3. A dispenser for dry materials of the character described for dispensing either a measured or an unmeasured quantity of the contents thereof and comprising a cylindrical container, a cylindrical barrel encircling said container in rotatable relation therewith, means forming a bottom for said container spaced above the lower end thereof and leaving a flange extending downwardly therefrom, said bottom having an aperture therethrough of limited angular extent, said flange being relieved at a position angularly spaced from said aperture to form a discharge slot, a dispenser member mounted within said barrel and below said bottom for rotation with respect to said container, means forming at least one pocket of predetermined capacity in the upper surface of said dispenser member, a member threaded within the lower end of said barrel to secure said container and dispenser member therein, means forming a discharge spout through said threaded member, and means connecting said dispenser member to said barrel for rotation relative to said container to move each said pocket between a position of registry with said aperture for receiving a portion of the contents of said container and a position of registry with said discharge slot, each said pocket having the bottom thereof inclined outwardly and downwardly and terminating at a level spaced above the lower edge of said flange but below the upper edge of said slot to effect closing of said pocket by said flange when said pocket is in registry with said aperture and to effect discharge of the contents of said pocket through said spout when said pocket is in registry with said discharge slot.

4. A dispenser for dry materials of the character described comprising a generally cylindrical barrel adapted to stand in a substantially upright position, means at the upper end of said barrel forming an annular shoulder extending inwardly of said barrel, a cylindrical container rotatably positioned within said barrel, means forming a shoulder spaced from the upper end of said container and adapted to engage said shoulder on said barrel to limit upward movement of said container in said barrel, a portion of said container extending upwardly beyond said shoulder to form a handle for ready relative rotation of said container and barrel, means at the lower end of said barrel for retaining said container therein, means forming a discharge outlet at the bottom of said container and barrel, and means positioned within said barrel at the lower end of said container responsive to relative rotation of said container and barrel to deliver a predetermined measured quantity of the contents of said container to said discharge outlet.

5. A dispenser for dry materials of the character described comprising a generally cylindrical barrel adapted to stand in a substantially upright position, means at the upper end of said barrel forming an annular shoulder extending inwardly of said barrel, a cylindrical container rotatably positioned within said barrel, means forming a shoulder spaced from the upper end of said container and adapted to engage said shoulder on said barrel to limit upward movement of said container in said barrel, a portion of said container extending upwardly beyond said shoulder to form a handle for ready relative rotation of said container and barrel, means at the lower end of said barrel for retaining said container therein, means forming a discharge aperture in the bottom of said container, a dispenser member mounted within said barrel for rotation therewith with respect to said container, means forming in said dispenser member a plurality of pockets of predetermined capacity adapted upon relative rotation of said barrel and container to be brought into and out of register with said discharge aperture, and means preventing discharge of the contents of each of said pockets from said barrel when each said pocket is in register with said discharge aperture.

6. A dispenser for dry materials of the character described comprising a generally cylindrical barrel adapted to stand in a substantially upright position, means at the upper end of said barrel forming an annular shoulder extending inwardly of said barrel, a cylindrical container rotatably positioned within said barrel, means forming a shoulder spaced from the upper end of said container and adapted to engage said shoulder on said barrel to limit upward movement of said container in said barrel, a portion of said container extending upwardly beyond said shoulder to form a handle for ready relative rotation of said container and barrel, means at the lower end of said barrel for retaining said container therein, means forming a discharge aperture in the bottom of said container, a dispenser member mounted within said barrel for rotation therewith with respect to said container, means forming in said dispenser member a plurality of pockets of predetermined capacity adapted upon relative rotation of said barrel and container to be brought into and out of register with said discharge aperture, means preventing discharge of the contents of each of said pockets from said barrel when each said pocket is in registry with said discharge aperture, means forming a discharge slot at a position angularly spaced from said discharge aperture, and cooperating scale means carried by said shoulders to indicate the extent of relative rotation of said barrel and container for movement of each of said pockets from a position of registry with said discharge aperture to a position of registry with said discharge slot.

7. A dispenser for dry materials of the character described comprising a generally cylindrical barrel adapted to stand in a substantially upright position, means at the upper end of said barrel forming an annular shoulder extending inwardly of said barrel, a cylindrical container rotatably positioned within said barrel, means forming a shoulder spaced from the upper end of said container and adapted to engage said shoulder on said barrel to limit upward movement of said container in said barrel, a portion of said container extending upwardly beyond said shoulder to form a handle for ready relative rotation of said container and barrel, means forming a bottom for said container having a discharge aperture therein, a dispenser member mounted within said barrel for rotation therewith with respect to said container and adapted in response to such rotation to receive a predetermined measured quantity of the contents of said container through said discharge aperture and to discharge the same from said barrel, a member threaded in the lower end of said barrel for retaining said container and dispenser member therein, said dispenser member including an upper portion adapted to extend within said container and a lower flange portion adapted to overlie the end of said container, a shoulder in the lower end of said barrel overlying said flange portion, and means within said container for abutting the upper portion of said dispenser member to maintain said flange portion in spaced relation with said overlying shoulder providing clearance for said dispenser member and threaded member axially of said barrel for adjustment of said parts to take up wear.

8. A portable dispenser for dry materials comprising a barrel adapted to stand in a substantially upright position, a container mounted for rotation within said barrel and extending upwardly beyond the top thereof to provide a handle for effecting relative rotation of said container and barrel, means within said barrel at the bottom of said container for measuring a predetermined quantity of said contents, said barrel extending below said bottom of said container for receiving said measuring means, a discharge opening in the bottom of said container, a discharge outlet from said barrel positioned in angularly spaced relation with said discharge opening, said measuring means including a pocket adapted for selective registry with said opening or said outlet, and means operatively connecting said measuring means to said barrel for rotation therewith between a position of registry of said pocket with said opening to receive a measured quantity of said contents from said container and a position of registry with said outlet for discharging said measured quantity of said contents through said outlet.

ROBERT R. LOWRY.

REFERENCES CITED

The following references are of record in the file of this patent:

UNITED STATES PATENTS

| Number | Name | Date |
| --- | --- | --- |
| 909,657 | Patterson | Jan. 12, 1909 |
| 1,204,111 | Anderson | Nov. 7, 1916 |
| 1,719,865 | Albright | July 9, 1929 |
| 1,959,874 | Mills | May 22, 1934 |
| 2,002,039 | McPhee | May 21, 1935 |
| 2,032,763 | Mostkoff | Mar. 3, 1936 |
| 2,072,938 | Berg | Mar. 9, 1937 |
| 2,170,955 | Thorn | Aug. 29, 1939 |